(12) United States Patent
Tonkin

(10) Patent No.: US 8,336,253 B2
(45) Date of Patent: Dec. 25, 2012

(54) IRRIGATION APPARATUS

(75) Inventor: Mark Tonkin, London (GB)

(73) Assignee: Design Technology and Innovation Limited (GB)

( * ) Notice: Subject to any disclaimer, the term of this patent is extended or adjusted under 35 U.S.C. 154(b) by 700 days.

(21) Appl. No.: 12/293,155

(22) PCT Filed: Mar. 16, 2007

(86) PCT No.: PCT/GB2007/000953
§ 371 (c)(1),
(2), (4) Date: Jun. 11, 2009

(87) PCT Pub. No.: WO2007/105007
PCT Pub. Date: Sep. 20, 2007

(65) Prior Publication Data
US 2010/0043283 A1     Feb. 25, 2010

(30) Foreign Application Priority Data

Mar. 16, 2006 (GB) .................................. 0605322.7

(51) Int. Cl.
*A01G 25/00* (2006.01)
(52) U.S. Cl. ............................................. 47/48.5; 47/79
(58) Field of Classification Search .................. 47/48.5, 47/79, 80, 81, 82, DIG. 10; 405/44, 45; 95/45, 95/52; 210/640, 321.74, 321.76, 321.77, 210/321.83, 321.85, 321.86
See application file for complete search history.

(56) References Cited

U.S. PATENT DOCUMENTS

| | | | |
|---|---|---|---|
| 4,805,343 A * | 2/1989 | Patterson et al. ................. | 47/79 |
| 4,928,427 A * | 5/1990 | Patterson ........................ | 47/48.5 |
| 5,303,503 A | 4/1994 | Patterson | |
| 2003/0019153 A1 * | 1/2003 | Tonkin et al. .................. | 47/66.7 |
| 2004/0099601 A1 * | 5/2004 | Tonkin et al. .................. | 210/640 |
| 2004/0124145 A1 * | 7/2004 | Tonkin et al. .................. | 210/640 |
| 2006/0193695 A1 * | 8/2006 | Ranjan et al. ................... | 405/43 |

FOREIGN PATENT DOCUMENTS

| | | |
|---|---|---|
| CN | 151 0988 A | 7/2004 |
| GB | 1450899 A1 | 9/1976 |
| JP | 45-019789 | 8/1970 |
| JP | 54-142840 | 10/1979 |
| JP | 04-077758 | 3/1992 |
| JP | 06-209644 | 8/1994 |
| JP | 08-140506 | 11/1994 |
| JP | 10-066462 | 3/1998 |
| JP | 2000-140521 | 5/2000 |
| JP | 2003-506051 | 2/2003 |

(Continued)

OTHER PUBLICATIONS www.bomimed.com, Reusable Transparent Tubing product description, pp. 1-2 (Feb. 8, 2006).

www.dlc.com.au, Anaestethic Tubing product description, product code 110156—corrugated tubing Hytrel plastic 1 Metre, pp. 1-2 (Feb. 8, 2006).

(Continued)

*Primary Examiner* — T. Nguyen
(74) *Attorney, Agent, or Firm* — Browdy and Neimark, PLLC

(57) ABSTRACT

The present invention relates to irrigation systems for irrigating a growing medium. The irrigation systems of the invention comprise a helical tubular hydrophilic membrane or a corrugated tubular hydrophilic membrane. The invention also relates to methods of irrigating a growing medium, and helical tubular hydrophilic membranes for use in an irrigation system.

18 Claims, 1 Drawing Sheet

FOREIGN PATENT DOCUMENTS

| | | |
|---|---|---|
| JP | 2003-525577 | 9/2003 |
| RU | 2205534 C2 | 6/2003 |
| WO | 9940031 A1 | 8/1999 |
| WO | 00/00016 | 1/2000 |
| WO | 01/10192 | 2/2002 |
| WO | 2004110132 A1 | 12/2004 |

OTHER PUBLICATIONS

International Preliminary Report on Patentability issued in WO/2007/105007 dated Sep. 16, 2008.
Written Opinion WO/2007/105007 issued in WO/2007/105007 dated Jun. 21, 2007.

* cited by examiner

IRRIGATION APPARATUS

The invention relates generally to irrigation devices for burial in a growing medium to be irrigated.

BACKGROUND OF THE INVENTION

The use of a hydrophilic membrane to provide moisture to a growing medium and/or to irrigate plants is known. WO-A-99/40031, for example, discloses a method for providing moisture to a growing medium wherein water vapour passes through a non-porous hydrophilic membrane via the process of pervaporation. The hydrophilic membrane is made from a hydrophilic polymer such as a copolyetherester elastomer, polyether-block-polyamide, polyether urethane, or polyvinyl alcohol. In one embodiment disclosed in this document the membrane forms a container that is buried in the growing medium. The container is provided with water and the water then passes through the membrane and is transmitted into the growing medium as water vapour via the process of pervaporation. Contaminated water can be used in the methods disclosed in this document since the hydrophilic membrane limits the passage of contaminants into the growing medium.

Similarly, WO-A-01/10192 discloses an irrigation device comprising a container for water wherein the container comprises a hydrophilic membrane and one surface that is impermeable to water in all forms. The container can be completely buried in a growing medium. WO-A-01/10193 discloses a method for modifying plant root growth wherein plant roots are grown in close proximity to a hydrophilic membrane which releases water as the roots grow. The membrane can be in the form of a sealed cylinder that is buried in the growing medium and connected to a water source.

In all of the above systems the container formed from the hydrophilic membrane is sealed in order to prevent leakage of contaminants into the growth medium and/or to allow close control of the supply of water to the growth medium. If the membrane had any holes, or if the membrane ruptured during use, contaminants would leak into the growing medium and water would leak out of the container and flood the growing medium.

SUMMARY OF THE INVENTION

The Applicant has noticed that when hydrophilic membranes come into contact with water they absorb water and may expand. A tube made of a copolyetherester elastomer, for example, can expand by at least as much as 10% along its length when hydrated. This can cause problems if the membrane is buried in a growing medium as in the case of the above methods, when the increase in membrane size cannot be accommodated in the enclosed space in the growth medium. For a tube that is 30 m long, for example, an extra 3 m in length may have to be accommodated when the tube becomes hydrated. If the expansion cannot be accommodated, the membrane may become compressed or distorted and therefore rupture and break, allowing contaminated water to leak into the growing medium. The tube may also fold onto itself within the confined space of the growing medium which would prevent the passage or flow of water and so reduce its effectiveness.

It is an object of the invention to provide an irrigation apparatus which at least partially alleviates the aforementioned problems.

When viewed from a first aspect the present invention provides a tubular hydrophilic membrane for burial in a growing medium, said tube being formed into a helix.

In a second aspect, the invention provides an irrigation system comprising a helical tubular hydrophilic membrane buried in a growing medium.

In a third aspect, the invention provides a method of irrigating a growing medium said method comprising passing water through a helical tubular hydrophilic membrane buried in a growing medium, such that water passing through the hydrophilic membrane and into the growing medium via the process of pervaporation.

In a fourth aspect, the present invention provides an irrigation system comprising a corrugated tubular hydrophilic membrane buried in a growing medium.

DESCRIPTION OF THE INVENTION

Figure 1:
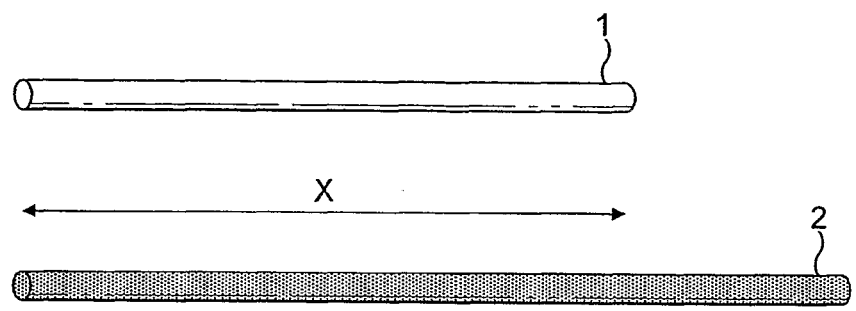
FIG. 1 shows a dehydrated tube 1 and a hydrated tube 2 in accordance with the invention.
Figure 2:
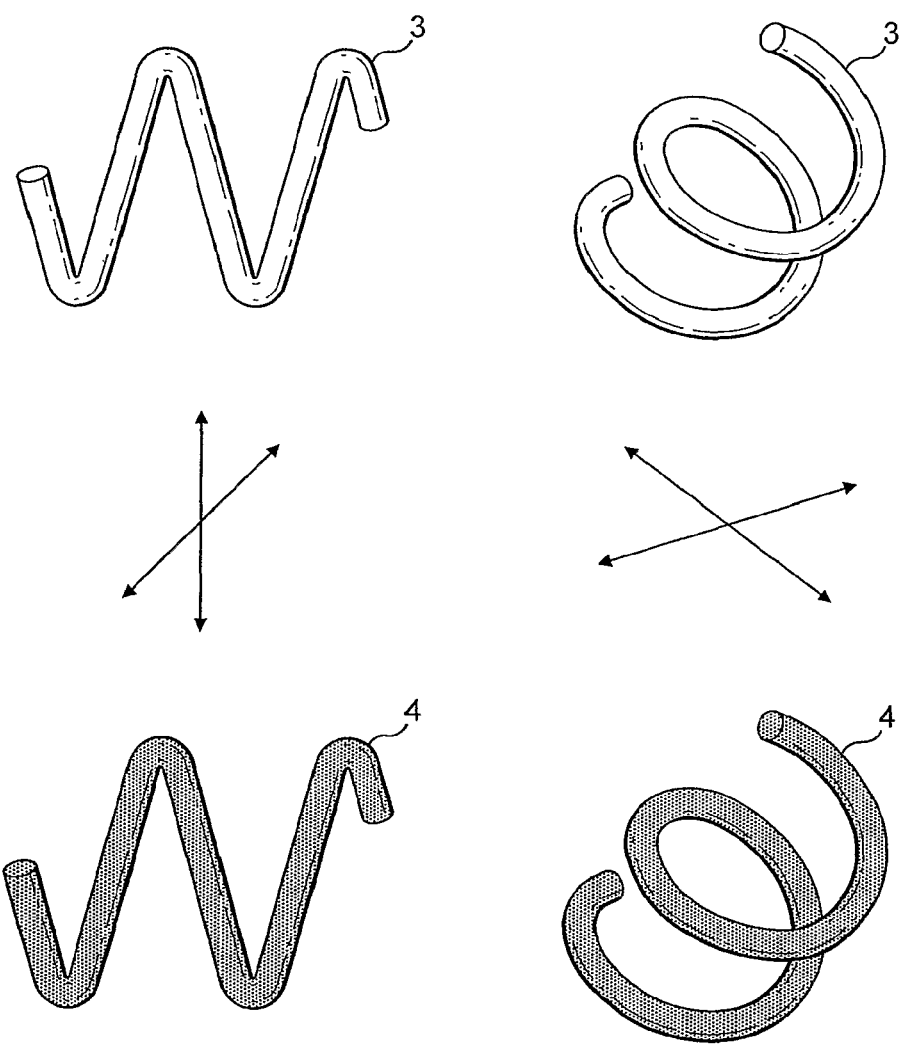
FIG. 2 shows a dehydrated tube 1 and a hydrated tube 2 are wound into helixes in accordance with the invention.

When a helical tubular membrane of the kind described above is buried in a growing medium and provided with water, the expansion of the hydrophilic membrane and therefore the expansion of the tube along its length can be accommodated more easily by the helical shape since the pressure exerted by the expansion of the tube on the surrounding medium is then distributed along its length rather than being confined to the two ends. In other words the absolute linear expansion along the axis of the membrane is reduced. As demonstrated in FIG. 1, when a "straight" dehydrated tube (1) is provided with water it may expand along its length. The hydrated tube (2) may be 10% longer than the dehydrated tube (1), for example. However, as shown in FIG. 2, when the dehydrated tube is wound into a helix (3), the increase in the length of the tube upon hydration is accommodated by expansion in three dimensions. In particular, the increase in tube length causes the diameter of the hydrated helix (4) to increase as well as the helix length. This means that the expansion in any one direction is minimised and the expansion is therefore more easily accommodated. This means that the membrane is less likely to rupture or fold. The disadvantages discussed above are therefore reduced.

The helical shape also provides for a controlled variable surface area for pervaporation by increasing or decreasing the surface area of hydrophilic membrane that is used in any particular enclosed space. This means that a greater or lesser irrigation density can be obtained, as desired.

When a corrugated tubular membrane of the kind described above is buried in a growing medium and provided with water, the expansion of the hydrophilic membrane and therefore the expansion of the tube along its length can be accommodated by the corrugated nature of the tubing. In particular, the distance between the ridges and grooves of the corrugated tubing can shorten in order to accommodate the additional membrane material. In other words, the ridges and grooves in the tube wall can compress in an action similar to the compression of an accordion. Thus, expansion of the overall length of the tubing can be minimised.

In a fifth aspect, the invention provides a method of irrigating a growing medium said method comprising passing water through a corrugated tubular hydrophilic membrane buried in a growing medium, such that water passes through the hydrophilic membrane and into the growing medium via the process of pervaporation.

In one particularly preferred embodiment of the invention the tubular hydrophilic membrane is corrugated and the corrugated tube is formed into a helix. In accordance with this embodiment, expansion of the membrane can be accommodated by compression of the ridges and grooves in the corrugated tubing, and by expansion of the membrane in three dimensions. Thus, expansion of the membrane can be accommodated. In addition, corrugated tubing has increased flexibility when compared to non-corrugated tubing and can therefore be easily formed into a helix.

The tubular membranes of the invention could, as in the prior art, be used as a container of static water which is replenished as it is depleted. Preferably though the ends of the tubular membranes are not sealed, which allows water to be flushed through the tube without removing the tube from the growing medium.

According to one preferred embodiment, the water source comprises impurities such as dissolved impurities or suspended impurities, particularly salts, pollutants, or biological materials, such as bacteria or viruses. In one particularly preferred embodiment the water source comprises salt water such as sea water or brackish water.

When water comprising impurities is used as the water source, the impurities are contained within the tubular membrane and do not pass into the growing medium.

Preferably the ends of the tubular membrane are accessible such that the water can be provided to the membrane without disturbing the growing medium.

The term helical should not be taken to mean that the shape of the conduit is a strict mathematical helix. For example the loops of the helix need not all be the same size or the same spacing.

By a corrugated tube is meant a tube formed either from discrete spaced rings or a helix or spiral, where the material between the rings or the loops of the helix or spiral is flexible so that they can move towards and away from each other. Such tubing is sometimes known as "accordion tubing". The rings or loops need not all be the same size and/or have the same spacing, however. The rings or helix or spiral could be of different material to the tube and attached thereto, but preferably they or it are formed from the tube itself—e.g. by forming the surface of the tube into an undulating or sawtooth profile.

The tubular membranes of the invention can have any cross-section, for example circular, oval, square etc.

By pervaporation is meant the process wherein a given solvent permeates into a non-porous membrane or coating, is transported across the membrane and is subsequently released from the opposite face of the membrane or coating in the form of vapour. Pervaporation is therefore different from known filtration, distillation or reverse osmosis processes in that the product is a vapour and not a liquid. If the solvent is water, non-porous hydrophilic membranes are suitable for pervaporation, because water is readily absorbed by, transported across and released from such a membrane.

"Hydrophilic membrane" means a non-porous membrane that absorbs water, i.e. that allows water to pass through. If there is a humidity gradient across the hydrophilic membrane, this absorbed water may diffuse through the thickness of the membrane and may be emitted from its opposite face. Hydrophilic membranes or coatings, hereinafter collectively referred to as membranes in this disclosure, feature sufficiently high water vapour transmission rates, as defined below, so that water that has passed through the membranes can be used directly to irrigate plants and the like. Such membranes can comprise one or more individual layers made from materials including but not limited to the same or different hydrophilic polymers. As long as the water vapour permeation rate of the membrane in total is sufficiently high, this water can be provided at a rate consistent with its use in a given practical application as described. The non-porous nature of the membranes disclosed here serves to exclude any particulate impurities from passing through such a membrane, including microbes such as bacteria or viruses. In addition, it has been discovered that membranes made from the hydrophilic polymers described in the present invention significantly reduce or prevent the passage of dissolved salts. Therefore, the ability to use not only freshwater, but also water that may contain suspended or dissolved impurities, to produce desired amounts of purified water by pervaporation allows saline water, including but not limited to seawater or brackish water, after processing through the apparatus embodying the present invention, to be used to irrigate land and sustain plant growth, and/or for the controlled release of water vapour into an environment.

The hydrophilic membrane may be present either in the form of an unsupported structure or coated on or adhered to a support material.

Useful support materials include woven, non-woven or bonded papers, fabrics and screens permeable to water vapour, including those constructed from fibres of organic and inorganic polymers stable to moisture such as polyethylene, polypropylene, fibreglass and the like. The support material both increases strength and protects the membrane. The support material may be disposed on only one side of the hydrophilic polymer membrane or both sides. When disposed on only one side, the support material can be in contact with the source of water or away from it. Typically the support material is disposed on the outside of the tubes formed by the hydrophilic polymer membrane to best protect the membrane from physical degradation.

The rate which the water pervaporates through the membrane made from the hydrophilic polymer depends, among other factors, upon the moisture content on the non-water side. Therefore, the irrigation systems of the present invention are self-regulating and may be "passive" in nature, providing more water to plants under dry conditions and less under humid conditions.

In the context of this disclosure, the hydrophilic membranes for use with the apparatus embodying the invention comprise one or more hydrophilic polymers. "Hydrophilic polymers" means polymers which absorb water when in contact with liquid water at room temperature according to the International Standards Organization specification ISO 62 (equivalent to the American Society for Testing and Materials specification ASTM D 570).

A preferred hydrophilic membrane comprises a hydrophilic polymer having a water vapour transmission rate (WVTR) according to ASTM E96-95 (Procedure BW) of at least 400 $g/m^2/24$ h, measured using air at 23° C. and 50% relative humidity at a velocity of 3 m/s on a film of total thickness 25 microns. A more preferred hydrophilic membrane layer comprises a hydrophilic polymer having a water vapour transmission rate according to ASTM E96-95 (Procedure BW) of at least 3500 $g/m^2/24$ h, measured using air at 23° C. and 50% relative humidity at a velocity of 3 m/s on a film of total thickness 25 microns.

The hydrophilic polymer can be one or a blend of several polymers, for example, the hydrophilic polymer can be a copolyetherester elastomer or a mixture of two or more copolyetherester elastomers as described below, such as polymers available from E.I. du Pont de Nemours and Company under the trade name Hytrel®; or a polyether-block-polyamide or a mixture of two or more polyether-block-polyamides, such as polymers available from the Elf-Atochem Company of Paris, France under the trade name of PEBAX; or a polyether urethane or a mixture of polyether urethanes; or homopolymers or copolymers of polyvinyl alcohol or a mixture of homopolymers or copolymers of polyvinyl alcohol.

A particularly preferred polymer is a copolyetherester elastomer or mixture of two or more copolyetherester elastomers having a multiplicity of recurring long-chain ester units and short-chain ester units joined head-to-tail through ester linkages, where the long-chain ester units are represented by the formula:

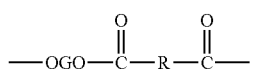

(I)

and said short-chain ester units are represented by the formula:

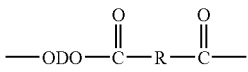

(II)

wherein:
  a) G is a divalent radical remaining after the removal of terminal hydroxyl groups from a poly(alkylene oxide) glycol having a number average molecular weight of about 400-4000;
  b) R is a divalent radical remaining after removal of carboxyl groups from a dicarboxylic acid having a molecular weight less than 300;
  c) D is a divalent radical remaining after removal of hydroxyl groups from a diol having a molecular weight less than about 250; optionally
  d) the copolyetherester contains 0-68 weight percent based on the total weight of the copolyetherester, ethylene oxide groups incorporated in the long-chain ester units of the copolyetherester; and
  e) the copolyetherester contains about 25-80 weight percent short-chain ester units.

This preferred polymer is suitable for fabricating into thin but strong membranes, films and coatings. The preferred polymer, copolyetherester elastomer and methods of making it are known in the art, such as are disclosed in U.S. Pat. No. 4,725,481 for a copolyetherester elastomer with a WVTR of 3500 g/m²/24 hr, or U.S. Pat. No. 4,769,273 for a copolyetherester elastomer with a WVTR of 400-2500 g/m²/24 hr. Both are hereby incorporated by reference.

The hydrophilic polymer can be compounded with antioxidant stabilizers, ultraviolet stabilizers, hydrolysis stabilizers, dyes or pigments, fillers, anti-microbial reagents, and the like.

The use of commercially available hydrophilic polymers as membranes is possible in the context of the present invention, although it is more preferable to use copolyetherester elastomers having a WVTR according to ASTM E96-95 (Procedure BW) of more than 400 g/m²/24 h measured on a film thickness of 25 microns using air at 23° C. and 50% relative humidity at a velocity of 3 m/s. Most preferred is the use of membranes made from commercially available copolyetherester elastomers having a WVTR according to ASTM E96-95 (Procedure BW) of more than 3500 g/m²/24 h, measured on a film of thickness 25 microns using air at 23° C. and 50% relative humidity at a velocity of 3 m/s.

In the context of this disclosure, a "growing medium" is a medium in which the roots of plants grow. Therefore the term "growing medium" includes naturally occurring or artificially amended soils used in but not limited to agriculture, horticulture and hydroponics. These soils include varying amounts of sand, silt, clay and humus. "Growing medium" also includes but is not limited to other materials used for growing plants, such as vermiculite, perlite, peat moss, shredded tree fern trunks, chipped or shredded tree bark and shredded coconut husks.

The invention claimed is:

1. An irrigation system comprising
  a non-porous corrugated tubular hydrophilic membrane buried in a growing medium,
  wherein said non-porous corrugated tubular hydrophilic membrane is formed into a helix,
  wherein the material between the rings or the loops of the helix is flexible permitting movement of rings or loops toward and away from adjacent rings or loops.

2. The irrigation system according to claim 1 wherein said hydrophilic membrane is coated on or adhered to a support material.

3. The irrigation system according to claim 1 wherein said hydrophilic membrane comprises a hydrophilic polymer having a water vapour transmission rate according to ASTM E96-95 (Procedure BW) of at least 400 g/m²/24 h, measured using air at 23° C. and 50% relative humidity at a velocity of 3 m/s on a film of total thickness 25 microns.

4. The irrigation system according to claim 1 wherein said hydrophilic membrane comprises a copolyetherester elastomer or a mixture of two or more copolyetherester elastomers; a polyether-block-polyamide or a mixture of two or more polyether-block-polyamides; a polyether urethane or a mixture of two or more polyether urethanes; or a homopolymer or copolymer of polyvinyl alcohol or a mixture of two or more homopolymers or copolymers of polyvinyl alcohol.

5. The irrigation system according to claim 1 wherein said hydrophilic membrane comprises a copolyetherester elastomer or mixture of two or more copolyetherester elastomers having a multiplicity of recurring long-chain ester units and short-chain ester units joined head-to-tail through ester linkages, where the long-chain ester units are represented by the formula:

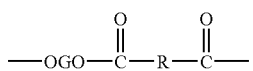

(I)

and said short-chain ester units are represented by the formula:

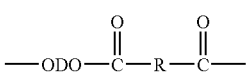

(II)

wherein:
  a) G is a divalent radical remaining after the removal of terminal hydroxyl groups from a poly(alkylene oxide) glycol having a number average molecular weight of about 400-4000;
  b) R is a divalent radical remaining after removal of carboxyl groups from a dicarboxylic acid having a molecular weight less than 300; and c) D is a divalent radical remaining after removal of hydroxyl groups from a diol having a molecular weight less than about 250.

6. The irrigation system according to claim 1 wherein said hydrophilic membrane comprises a copolyetherester elastomer having water vapour transmission rate according to ASTM E96-95 (Procedure BW) of more than 400 g/m$^2$/24 h measured on a film thickness of 25 microns using air at 23° C. and 50% relative humidity at a velocity of 3 m/s.

7. A method of irrigating a growing medium, said method comprising
  passing water from a water source through one of a non-porous corrugated tubular hydrophilic membrane buried in a growing medium, such that water vapor passes through the hydrophilic membrane and into the growing medium wherein said non-porous corrugated tubular hydrophilic membrane is formed into a helix,
  wherein material between rings of the corrugated tubular hydrophilic membrane or loops of the helix is flexible permitting movement of the rings or loops toward and away from each other.

8. The method of claim 7 wherein water from the water source permeates into the non-porous hydrophilic membrane, is transported across the membrane and is subsequently released from the opposite face of the membrane in the form of water vapour.

9. The method according to claim 7 wherein the ends of the tubular membrane are not sealed, and wherein water is flushed through the tube without removing the tube from the growing medium.

10. The method according to claim 7 wherein the water source comprises impurities selected from dissolved impurities, suspended impurities, pollutants, or biological materials and wherein the impurities are contained within the tubular membrane and do not pass into the growing medium.

11. The method according to claim 10 wherein the water source comprises salt.

12. The method according to claim 7, wherein said hydrophilic membrane is coated on or adhered to a support material.

13. The method according to claim 7, wherein said hydrophilic membrane comprises a hydrophilic polymer having a water vapour transmission rate according to ASTM E96-95 (Procedure BW) of at least 400 g/m$^2$/24 h, measured using air at 23° C. and 50% relative humidity at a velocity of 3 m/s on a film of total thickness 25 microns.

14. The method according to claim 7, wherein said hydrophilic membrane comprises a copolyetherester elastomer or a mixture of two or more copolyetherester elastomers; a polyether-block-polyamide or a mixture of two or more polyether-block-polyamides; a polyether urethane or a mixture of two or more polyether urethanes; or a homopolymer or copolymer of polyvinyl alcohol or a mixture of two or more homopolymers or copolymers of polyvinyl alcohol.

15. The method according to claim 7, wherein said hydrophilic membrane comprises a copolyetherester elastomer or mixture of two or more copolyetherester elastomers having a multiplicity of recurring long-chain ester units and short-chain ester units joined head-to-tail through ester linkages, where the long-chain ester units are represented by the formula:

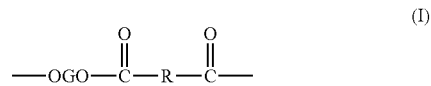

(I)

and said short-chain ester units are represented by the formula:

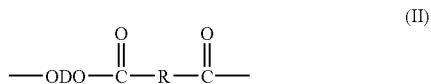

(II)

wherein:
  k) G is a divalent radical remaining after the removal of terminal hydroxyl groups from a poly(alkylene oxide) glycol having a number average molecular weight of about 400-4000;
  l) R is a divalent radical remaining after removal of carboxyl groups from a dicarboxylic acid having a molecular weight less than 300; and
  m) D is a divalent radical remaining after removal of hydroxyl groups from a diol having a molecular weight less than about 250.

16. The method according to claim 7, wherein said hydrophilic membrane comprises a copolyetherester elastomer having water vapour transmission rate according to ASTM E96-95 (Procedure BW) of more than 400 g/m$^2$/24 h measured on a film thickness of 25 microns using air at 23° C. and 50% relative humidity at a velocity of 3 m/s.

17. The irrigation system according to claim 5 wherein the copolyetherester is present in an amount up to 68 weight percent based on the total weight of the copolyetherester, ethylene oxide groups incorporated in the long-chain ester units of the copolyetherester, and the copolyetherester contains about 25-80 weight percent short-chain ester units.

18. The method according to claim 15 wherein the copolyetherester is present in an amount up to 68 weight percent based on the total weight of the copolyetherester, ethylene oxide groups incorporated in the long-chain ester units of the copolyetherester, and the copolyetherester contains about 25-80 weight percent short-chain ester units.

* * * * *